US012395433B2

(12) United States Patent
Kodialam et al.

(10) Patent No.: US 12,395,433 B2
(45) Date of Patent: Aug. 19, 2025

(54) MACHINE LEARNING SEGMENT ROUTING FOR MULTIPLE TRAFFIC MATRICES

(71) Applicant: Nokia Solutions and Networks Oy, Espoo (FI)

(72) Inventors: Muralidharan Kodialam, Austin, TX (US); Tv Lakshman, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 123 days.

(21) Appl. No.: 18/298,660

(22) Filed: Apr. 11, 2023

(65) Prior Publication Data

US 2024/0348547 A1    Oct. 17, 2024

(51) Int. Cl.
*H04L 45/24* (2022.01)
*H04L 41/16* (2022.01)
*H04L 45/00* (2022.01)
*H04L 47/12* (2022.01)
*H04W 28/02* (2009.01)
*H04W 28/20* (2009.01)
*H04W 28/26* (2009.01)
*H04W 36/22* (2009.01)

(52) U.S. Cl.
CPC .............. *H04L 47/12* (2013.01); *H04L 41/16* (2013.01); *H04L 45/34* (2013.01)

(58) Field of Classification Search
CPC ......... H04L 45/04; H04L 45/24; H04L 45/34; H04L 41/12; H04L 45/02; H04L 45/22; H04L 41/147; H04L 45/124; H04L 45/655; H04L 45/70; G06N 202/00; H04W 40/02

See application file for complete search history.

(56) References Cited

U.S. PATENT DOCUMENTS

| 10,277,475 | B2 | 4/2019 | Girmonsky |
| 10,277,476 | B2 | 4/2019 | Mermoud et al. |
| 10,873,533 | B1 | 12/2020 | Ismailsheriff et al. |

(Continued)

OTHER PUBLICATIONS

Bernárdez, G. et al. "Is Machine Learning Ready for Traffic Engineering Optimization?" 2021 IEEE 29th International Conference on Network Protocols (ICNP). IEEE, 2021.

(Continued)

*Primary Examiner* — Nicholas R Taylor
*Assistant Examiner* — Ho T Shiu
(74) *Attorney, Agent, or Firm* — Duft & Bornsen, PC

(57) ABSTRACT

In some embodiments, there may be provided a method that includes receiving a first traffic matrix; receiving information regarding links associated with each segment of the network; determining a total amount of segment flow using the at least one non-linear deflection parameter applied to the traffic demand of the first traffic matrix; determining a link flow for each of the links using the total amount of segment flow and the second input to the machine learning model; determining link utilization for each of the links using the link flows and a capacity for each of the links; learning, by the machine learning model using a gradient descent, a minimum of a maximum amount of the link utilization over the links by at least adjusting a value of the at least one non-linear deflection parameter. Related systems, methods, and articles of manufacture are also disclosed.

19 Claims, 9 Drawing Sheets

(56) References Cited

U.S. PATENT DOCUMENTS

| | | | |
|---|---|---|---|
| 10,990,878 B2 | 4/2021 | Olabiyi et al. | |
| 2016/0294699 A1* | 10/2016 | Kodialam | H04L 47/125 |
| 2017/0134089 A1* | 5/2017 | Mansouri Rad | H04J 14/0271 |
| 2017/0310395 A1* | 10/2017 | Mehrvar | H04J 14/0257 |
| 2018/0176134 A1* | 6/2018 | Pignataro | H04L 67/10 |

OTHER PUBLICATIONS

Chretien, S. et al. "Online shortest paths with confidence intervals for routing in a time varying random network." 2018 International Joint Conference on Neural Networks (IJCNN). 2018.

Kodialam, M. et al. "Network Link Weight Setting: a Machine Learning Based Approach." IEEE Conference on Computer Communications, IEEE INFOCOM 2022, pp. 2048-2057.

Mesquita, L. et al. "Traffic Matrix Prediction for Optical Networks." 2019 SBMO/IEEE MTT-S International Microwave and Optoelectronics Conference (IMOC). IEEE, 2019.

Todorov, D. et al., "Load Balancing model based on Machine Learning and Segment Routing in SDN," 2020 International Conference Automatics and Informatics (ICAI), IEEE, Oct. 1, 2020, 4 pages.

Extended European Search Report issued in co-pending European Application No. 24168303.6-1206 mailed Aug. 13, 2024, 8 pages.

* cited by examiner

Receiving, as a first input to a machine learning model, a first traffic matrix, wherein the first traffic matrix indicates traffic demand between at least a source node and a destination node of a network 302

Receiving, as a second input to the machine learning model, information regarding links associated with each segment of the network, wherein each segment corresponds to a pair of nodes of the network 304

Transforming, by the machine learning model, at least one deflection parameter into at least one non-linear deflection parameter, wherein the at least one deflection parameter indicates a fractional amount of traffic that is carried between the source node and the destination node and deflected to an intermediary node 306

Determining, by the machine learning model, a total amount of segment flow using the at least one non-linear deflection parameter applied to the traffic demand of the first traffic matrix 308

Determining, by the machine learning model, a link flow for each of the links using the total amount of segment flow and the second input to the machine learning model 310

Determining, by the machine learning model, link utilization for each of the links using the link flows and a capacity for each of the links 312

Learning, by the machine learning model using a gradient descent, a minimum of a maximum amount of the link utilization over the links by at least adjusting a value of the at least one non-linear deflection parameter 314

Providing, by the machine learning model, an output comprising the at least one non-linear deflection parameter and/or the at least one non-linear deflection parameter transformed back into a linear domain 316

FIG. 3

MACHINE LEARNING SEGMENT ROUTING FOR MULTIPLE TRAFFIC MATRICES

FIELD

The subject matter described herein relates to networking and machine learning.

BACKGROUND

Machine learning (ML) models may learn via training. The ML model may take a variety of forms, such as an artificial neural network (or neural network, for short), decision trees, and/or the like. The training of the ML model may be supervised (with labeled training data), semi-supervised, or unsupervised. When trained, the ML model may be used to perform an inference task.

SUMMARY

In some embodiments, there may be provided a method that includes receiving, as a first input to a machine learning model, a first traffic matrix, wherein the first traffic matrix indicates traffic demand between at least a source node and a destination node of a network; receiving, as a second input to the machine learning model, information regarding links associated with each segment of the network, wherein each segment corresponds to a pair of nodes of the network; transforming, by the machine learning model, at least one deflection parameter into at least one non-linear deflection parameter, wherein the at least one deflection parameter indicates a fractional amount of traffic that is carried between the source node and the destination node and deflected to an intermediary node; determining, by the machine learning model, a total amount of segment flow using the at least one non-linear deflection parameter applied to the traffic demand of the first traffic matrix; determining, by the machine learning model, a link flow for each of the links using the total amount of segment flow and the second input to the machine learning model; determining, by the machine learning model, link utilization for each of the links using the link flows and a capacity for each of the links; learning, by the machine learning model using a gradient descent, a minimum of a maximum amount of the link utilization over the links by at least adjusting a value of the at least one non-linear deflection parameter; and providing, by the machine learning model, an output comprising the at least one non-linear deflection parameter and/or the at least one non-linear deflection parameter transformed back into a linear domain.

In some variations, one or more of the features disclosed herein including the following features can optionally be included in any feasible combination. A plurality of traffic matrices (which are indicative of traffic demands between at least the source node and the destination node of the network) may be received. The total amount of segment flow is determined using the at least one non-linear deflection parameter applied to the traffic demands obtained from the plurality of traffic matrices. The output comprising the at least one non-linear deflection parameter and/or the at least one non-linear deflection parameter transformed back into the linear domain takes into account the learning using a plurality of traffic matrices indicative of traffic demands between at least the source node and the destination node of the network. The output is provided to one or more routing tables of the network. The output provides the fractional amount of traffic that is deflected to the intermediary node. The at least one non-linear deflection parameter is generated by at least transforming the at least one deflection parameter into an exponential domain and then normalizing the at least one non-linear deflection parameter to a value between zero and one. The machine learning model comprises a loss function including the at least one non-linear deflection parameter. The machine learning model performs the learning as an unconstrained optimization of the minimum of the maximum amount of the link utilization.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 3 depicts an example of a process for training a ML model, in accordance with some embodiments;

Figure 1A:
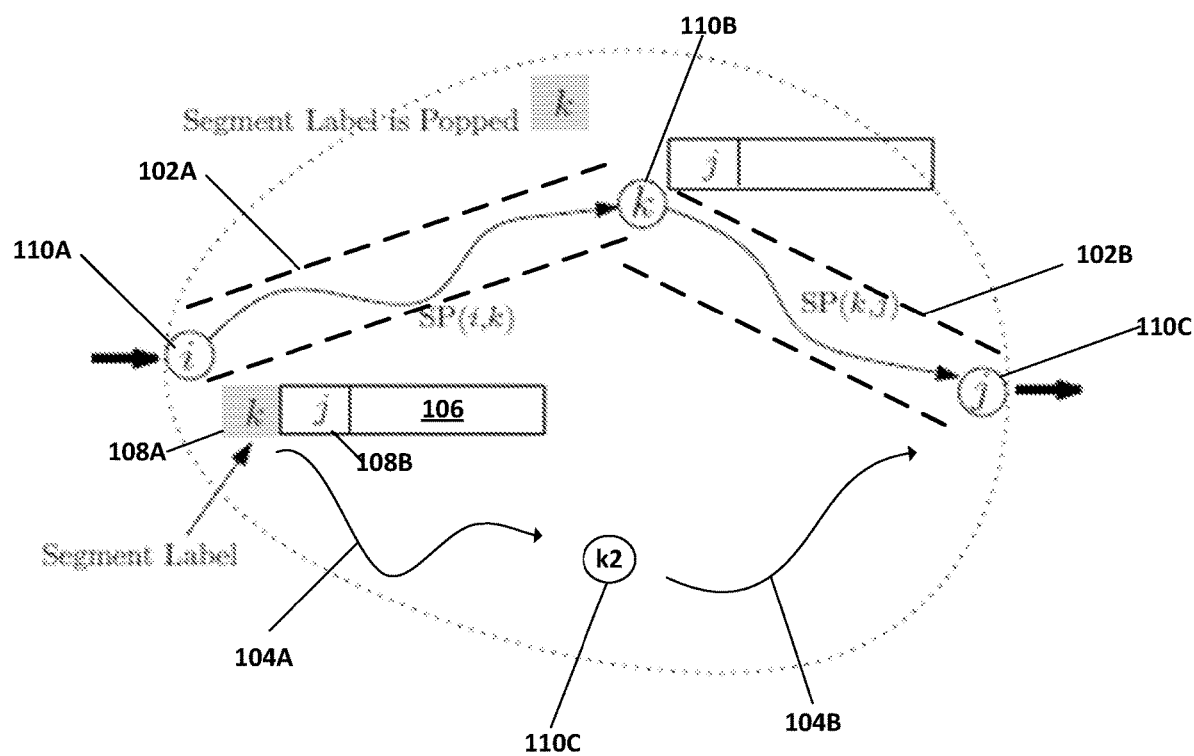
FIG. 1A depicts an example of segment routing between nodes i and j using segments, in accordance with some embodiments.

Like labels are used to refer to same or similar items in the drawings.

DETAILED DESCRIPTION

To route traffic on a network, each physical link in the network may have an associated link metric (also referred to as link weight or link cost). To route from node i to node j of the network for example, the network may route traffic based on a shortest path (e.g., minimum weight path), such as a path determined using the open shortest path first, OSPF, protocol between two nodes, such as node i and node j. This shortest path may be determined using the link metrics of the physical links between the nodes i and j. For example, each node along the path between nodes i and j may examine the destination address of a packet and may then forward that packet in accordance with the shortest path (which is determined based on link metrics) to the destination node j. In the case of segment routing, the traffic is also routed based on segments.

With segment routing, one or more segments between source and destination are specified from the source node to a destination node, but the physical links (or links) within a given segment may use shortest path routing. In the case of shortest path routing, the routing may also be in accordance with equal-cost multi-path routing (ECMP), for example. In ECMP, packets are forwarded to a given destination over multiple "equal" cost best paths using equal routing priority.

FIG. 1A depicts an example of segment routing between nodes i and j using segments. In the example of FIG. 1, there is a first segment 102A between node i 110A and node k 110B and a second segment 102B between nodes k 110B and node j 102B (wherein node k may be referred to as an intermediate or a deflection node). Within a given segment such as segment 102A or 102B, shortest path routing may be used to determine the links (e.g., physical links or path) used to carry the traffic, such as the packet 106. Formally, the segment may represent a minimum weight path between a pair of nodes. For example, the segment between nodes i and j is a minimum weight path between nodes i and j, wherein the minimum weight path is computed using the link metric.

Referring to the packet 106 at FIG. 1A, the packet includes a segment label "k" 108A and a destination address "j" 108B. The segment label specifies to node i 110A that packet 106 is to be forwarded to destination node j 110C over the segments 102A-B but deflected via intermediate node k 110B, while the physical links (within the segments) and associated link metrics may be used to determine the shortest path through the links of the segments 102A-B. Within each of the segments for example, shortest path routing may be used to determine the path through the physical links to carry the packet 106 to intermediate node k 110B.

However, shortest path routing may be inflexible and result in congestion in a network as the routing schemes may not be robust enough to take into account the different anticipated traffic patterns (or traffic matrices) that the network may experience.

In some embodiments, there is provided a machine learning based approach that determines a single routing scheme for the network that can handle some if not all of the anticipated traffic patterns (which may be defined using traffic matrices) for the network.

Figure 2:
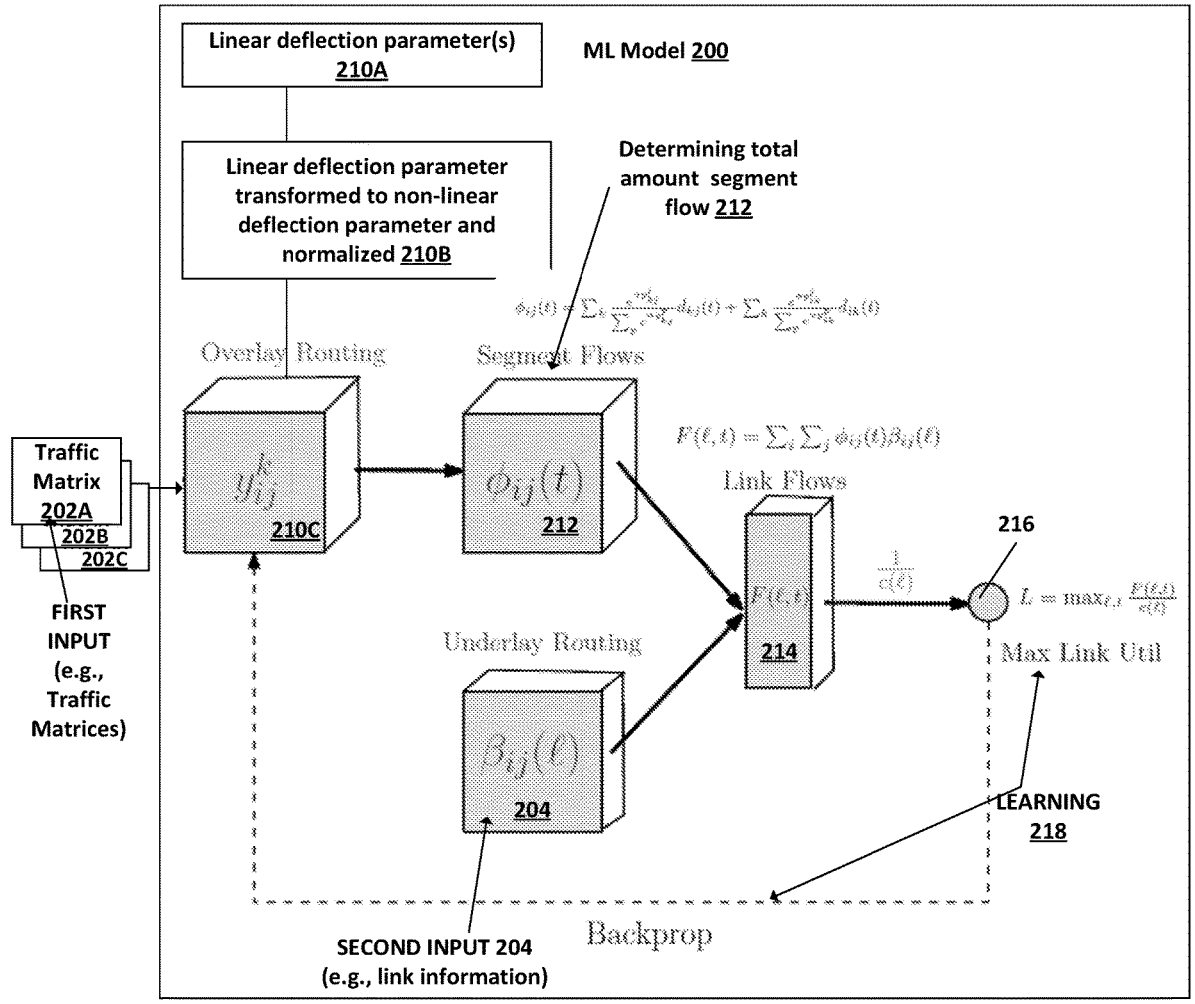
FIG. 2 depicts an example of a machine learning (ML) model, in accordance with some embodiments.

FIG. 2 depicts an example of a machine learning (ML) model 200, in accordance with some embodiments.

The ML model 200 may receive as an input at least one traffic matrix 202A. For example, the traffic matrix 202 may indicate traffic patterns between nodes of the network. In the example of FIG. 2, the traffic matrix may indicate at least the traffic pattern or anticipated demand between a source node i and a destination node j of the network. Between nodes i and j for example, the traffic matrix may indicate traffic demand $d_{ij}$. In other words, the traffic demand $d_{ij}$ may indicate an amount of traffic that the network needs to be able to carry between nodes i and j. The traffic matrix may also include traffic demand values between other source and destination nodes. More formally, the traffic matrix may comprise an n by n matrix, wherein n is the number of nodes in the network and wherein each of the $d_{ij}$ entries in the traffic matrix is the amount of traffic that needs to be carried between nodes i and j.

As the traffic patterns (or demands) for a network can vary for a variety of reasons, such as time of day, day of week, seasonal variations, events, and/or the like, the ML model 200 may receive a plurality of traffic matrices 202A-C, each of which represents a different type of traffic demand or pattern for the network. Moreover, these different types of traffic matrices may be used to enable the ML model to learn (as part of ML model training) a routing scheme (e.g., a single routing scheme) that satisfies these varied traffic matrices.

With respect to the different traffic matrices for example, a first traffic matrix may be associated with a seasonal peak traffic pattern (e.g., a holiday traffic pattern, such as Black Friday traffic or cyber Monday traffic), a second traffic matrix may correspond to a more typical workweek traffic pattern over the network, and a third traffic matrix may correspond to an event based traffic pattern (e.g., traffic pattern caused by an earthquake, sporting event, and/or other event which may cause an increase in traffic). Alternatively, or additionally, the traffic matrices may correspond to historical traffic patterns over the network and/or projected (or estimated) traffic patterns over the network. Alternatively, or additionally, the traffic matrices may be derived from actual network traffic patterns (e.g., historical traffic) and/or estimated or simulated traffic patterns. When there are a plurality of traffic matrices, the ML model may train using the plurality of traffic matrices and find a routing scheme for the network that is optimized for a robust set of these traffic matrices.

Although FIG. 2 depicts three traffic matrices 202A-C, other quantities of traffic matrices may be provided as well.

The ML model 200 may also receive as an input link information 204 regarding the links associated with each segment of the network. Referring to FIG. 1A for example, the segment 102A-B corresponds to a pair of nodes node i 110A and node j 110C with intermediate node k 110B. In this example, the segment may comprise one or more links (e.g., physical links), and these links may each be associated with (e.g., mapped to) link information. For example, the link information may include one or more values for $\beta_{ij}(l)$, which indicates a fractional amount of traffic carried on link l when traffic is routed on the segment from node i to node j, although the link information may include other link information as well such as capacity of a link ("link capacity) and/or other link characteristics. For example, $\beta_{ij}(l)$ may correspond to underlay routing parameters. Within each segment for example, minhop routing with ECMP may be used to route among the links of a segment.

Figure 1B:
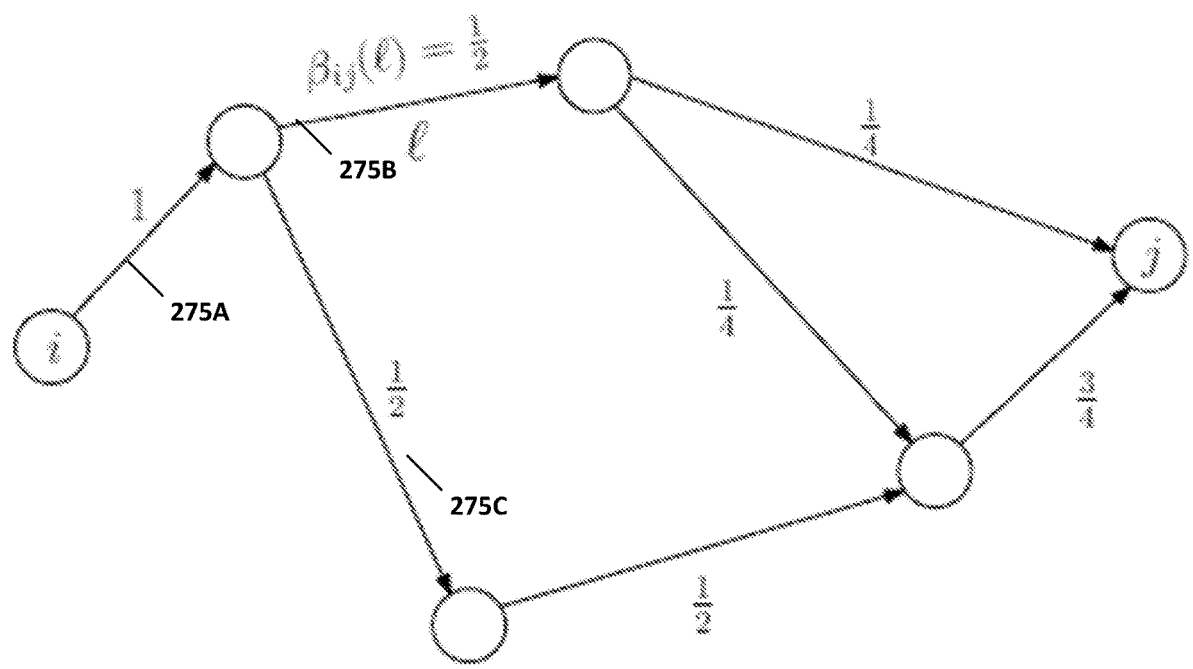
FIG. 1B depicts a single segment including a plurality of links, in accordance with some example embodiments.

FIG. 1B depicts a segment between nodes i and j including a plurality of links, wherein the nodes are represented by circles and the links are represented by lines coupling the nodes. The links correspond to physical links or connections between nodes of the network, so node i can communicate with node j only if there are one or more links link between nodes i and j. The fraction of traffic carried by a given link is denoted by $\beta ij(\ell)$ also referred to herein as segment to link mapping. For example, a link 275A carries all of the traffic of the segment, a link 275B carries half of the segment traffic destined for node j as the other half of the segment traffic is carried by a link 275C, and so forth (e.g., the segment to link mapping appear alongside each link). The segment to link mapping $\beta_{ij}(l)$ (e.g., 1, ½, ½, ½, ¼, ¼, and ¾) define the physical link layer routing among the nodes of the segment between nodes i and j. These segment to link mapping parameters describe the underlay routing over the links and thus what portion of the segment traffic flow is carried by the link. In other words, $\beta ij(\ell)$ indicates the fraction of traffic from source i to destination j that is routed on a given link $\ell$, such as link $\ell$ 275A, link $\ell$ 275B, and so forth.

Referring again to FIG. 2, it shows that the ML model 200 may transform at 210B a deflection parameter into a non-linear deflection parameter. For example, the ML model may receive a linear deflection parameter at 210A. The deflection parameter indicates a fractional amount of traffic (which is carried between a source node and a destination node) deflected to an intermediary node during, for example, segment routing. Referring to FIG. 1A at node i 110A for example, the linear deflection parameter may comprise a fractional amount (e.g., a percentage or other value), and this fractional amount may indicate the fractional portion of the segment traffic deflected to intermediate node k 110B. Referring to FIG. 1A, the deflection parameter at node i 110A for the segment 102A-B may be ¾ (or 0.75) towards node k, so ¾ of the traffic would be deflected towards intermediate node k 110B, and the remaining ¼ (0.25) would be deflected towards node k2 110C. Formally, the deflection parameter represents an amount of traffic between two nodes, such as node i and node j, that is deflected via node k. The deflection parameter may be determined by the ML model as part of learning.

As the ML model 200 determines the deflection parameters, the deflection parameters may be an initial set of deflection parameters, which the ML model adjusts as part of learning at 218.

To illustrate further by way of a numerical example, the segment's traffic flow between nodes i and j may be represented as follows:

$$\phi_{ij}(t) = \sum_k x_{kj}^i d_{kj}(t) + \sum_k x_{ik}^j d_{ik}(t), \qquad \text{Equation 1}$$

wherein the traffic flow is $\phi_{ij}$ and is the traffic flow over a segment between node i and node j; the deflection parameters are $x^i_{kj}$ and $x^i_{ik}$; and $d_{kj}(t)$ and $d_{ik}(t)$ are indicative of the traffic demand (which is obtained from the traffic matrix). In other words, the amount of traffic flow (which is between nodes nodes i and j) that is deflected via node k is a function of the defection parameter and the amount of traffic over the segment. Referring to the prior example where the deflection parameter was 0.75, given a traffic demand of 10 Gigabyte, the total flow over the segment via node k would be 7.5 Gigabytes.

Figure 1C:
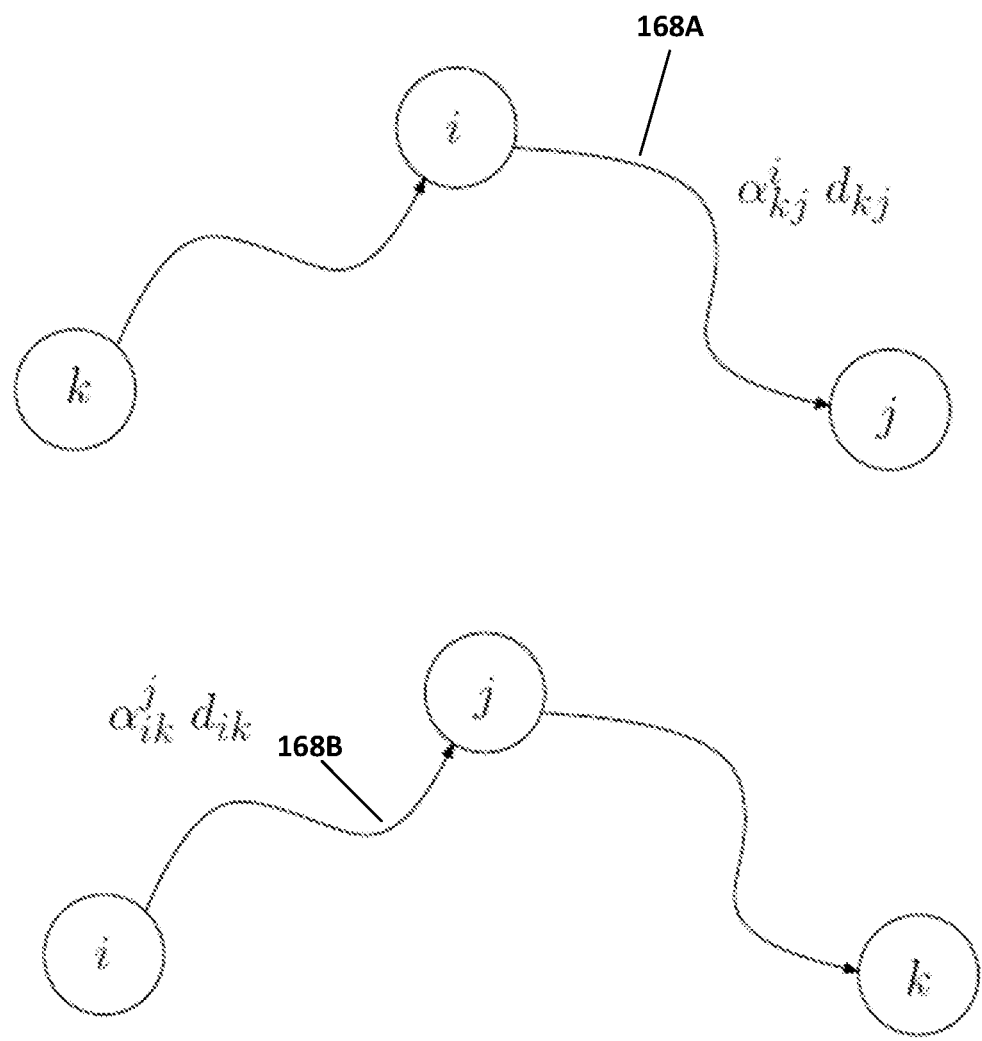
FIG. 1C depicts an example of a 2-hop segment, in accordance with some embodiments.

With respect to Equation 1, the actual traffic flow over the segment is computed for a segment between nodes i and j, and this traffic flow takes into account that the segment might be a second hop of a two hop segment 168A and a first hop 168B of a two hop segment as shown in FIG. 1C.

Referring again to FIG. 2 at 210B, the linear deflection parameter $x^k_{ij}$ may be transformed into a non-linear deflection parameter $y^k_{ij}$, wherein $x^k_{ij}$ is equal (or about equal) to $e^{\alpha y^k_{ij}}$, wherein e is Euler's number and $\alpha>0$ is a fixed constant value. This transformation from the linear deflection parameter $x^k_{ij}$ to a non-linear (e.g., an exponential domain, e) deflection parameter $y^k_{ij}$ enables an unconstrained optimization of the ML model 200 using $y^k_{ij}$. Moreover, the transformation into the non-linear domain may also include a normalization, so the constraint $\Sigma_k x^k_{ij}=1$ implies that:

$$x_{ij}^k = \frac{e^{\alpha y_{ij}^k}}{\sum_k e^{\alpha y_{ij}^k}}. \qquad \text{Equation 2}$$

As such, the transformation ensures that $x_{ij}^k \geq 0$ and $\Sigma_k x_{ij}^k=1$ are satisfied.

The non-linear deflection parameter $y^k_{ij}$ is indicative of the routing scheme 210C used over the network. In other words, given the deflection parameters for the segments of the network, the routing scheme (which represents the segment(s) as an overlay over the physical links) is defined for the network.

The ML learning model 200 may determine at 212 a total amount of segment flow. The total amount of segment flow is the amount of flow on a given segment in the network. Referring again to the segment 102A-B of FIG. 1A, the segment flow between nodes i and j is the total amount of flow (e.g., amount of traffic in packets, bits, megabytes, etc.) on a path (e.g., a shortest or minimum weight path) between nodes i and j.

For one or more (if not all of) segments in the network, the segment flows may be determined. The total amount of segment flow may be determined using the deflection parameter(s), such as the non-linear deflection parameters, applied to the traffic demands (e.g., $d_{ij}$) of the first traffic matrix 202, for example. Updating Equation 1 to include the non-linear deflection parameter of Equation 2, the traffic flow between nodes i and j may be represented as follows.

$$\phi_{ij}(t) = \sum_k \frac{e^{\alpha y_{kj}^i}}{\sum_p e^{\alpha y_{kj}^p}} d_{kj}(t) + \sum_k \frac{e^{\alpha y_{ik}^j}}{\sum_p e^{\alpha y_{ik}^p}} d_{ik}(t). \qquad \text{Equation 3}$$

The ML model may determine at 214 a link flow for each of the links using the total amount of segment flow (which was determined at 212) and the link information (obtained at 204). The link flow indicates the amount of traffic carried by a link, and a given segment may include, as noted, one or more links. And, these links may each have associated link information, such as link metrics parameters $\beta_{ij}(l)$ as noted above with respect to the example of FIG. 1B. With respect to segment 102A-B at FIG. 1A for example, the link flow through the one or more links of the segment(s) may be determined. To that end, the link flow $F(\ell, t)$ may be determined for a given segment as follows:

$$F(\ell, t) = \sum_i \sum_j \beta_{ij}(\ell) \phi_{ij}(t), \qquad \text{Equation 4}$$

wherein the traffic flow $\phi_{ij}$ is for a segment between nodes i and j and $\beta_{ij}(\ell)$ indicates the link metric (e.g., fraction of traffic from source i to destination j that is routed on a given link $\ell$).

Referring again to FIG. 2, the ML model may determine at 216 link utilization L for each of the links ($\ell$) of the network using the link flows of 214 and a capacity (c) for each of the links. For example, the link utilization for a link ($\ell$) is the amount of traffic flow of the link ($\ell$) divided by the capacity c($\ell$) for that link. In other words, link utilization may be defined as a ratio of the traffic flow on a link to the capacity of the link. If the link utilization is less than one, the amount of flow on the link does not exceed the capacity of the link. The link utilization is determined using the segment flow, which in turn is a function of the traffic matrix and the deflection parameter.

The ML model may then learn at 218 a minimum of a maximum amount of the link utilization over the links by at least adjusting a value of the at least one non-linear deflection parameter. For example, the minimum of the maximum link utilization may be determined based on the following:

$$\underset{\ell,t}{\text{minmax}} \frac{\sum_i \sum_j \beta_{ij}(\ell) \left[ \sum_k \frac{e^{\alpha y_{kj}^i}}{\sum_p e^{\alpha y_{kj}^p}} d_{kj}(t) + \sum_k \frac{e^{\alpha y_{ik}^j}}{\sum_p e^{\alpha y_{ik}^p}} d_{ik}(t) \right]}{c(\ell)},$$

Equation 5 where d_ij(t) refers to the traffic from node i to node j in traffic matrix t and c(l) is the capacity of link l. Equation 5 may be used as a loss (or objective function) by the ML model 200 to enable learning and/or optimization.

In Equation 5, the only unknown variable that can be adjusted by the ML learning model 200 to affect the outcome is the deflection parameter (or non-linear deflection) parameters, $y^i{}_{kj}$ and $y^j{}_{kj}$. As such, the ML model may adjust, at 218, the non-linear deflection parameters, $y^i{}_{kj}$ and $y^j{}_{kj}$ until the minimum is found of the maximum utilization of the links given the input traffic matrix 202. For example, backpropagation and gradient descent may be used to train the ML model by updating the weights of the ML model to minimize a loss function, such as Equation 5. Here, the nodes of the ML model may represents nodes of the network and the weights of the ML model may represent the deflection parameters at the corresponding network nodes.

FIG. 3 depicts an example of a process for ML learning of a routing scheme, in accordance with some embodiments.

At 302, the ML model may receive, as a first input, a first traffic matrix, wherein the first traffic matrix indicates traffic demand between at least a source node and a destination node of a network, in accordance with some embodiments. As noted above with respect to FIG. 2, the ML model 200 receives as an input at least one traffic matrix 202A, which indicates traffic patterns between nodes of the network.

At 304, the ML model may receive, as a second input, information regarding links associated with each segment of the network, wherein each segment corresponds to a pair of nodes of the network, in accordance with some embodiments. As noted with the example of FIG. 2, the ML model 200 receives link information 204 for the segments of the network. To illustrate further, for the segment 102A-B (which is depicted at FIG. 1A) the links (which couple node i and node j) are each mapped to link information, such as values for $\beta_{ij}(l)$, which indicates a fractional amount of traffic carried by each of the links.

At 306, the ML model may transform at least one deflection parameter into at least one non-linear deflection parameter, wherein the at least one deflection parameter indicates a fractional amount of traffic that is carried between the source node and the destination node and deflected to an intermediary node, in accordance with some embodiments. Referring again to FIG. 2, the ML model 200 may transform a linear deflection parameter (which indicates a fractional amount of traffic carried between a source node and a destination node deflected to an intermediary node) into a non-linear deflection parameter in the non-linear (e.g., exponential, e, domain). The ML model may also normalized the non-linear deflection parameter so that it is between 0 and 1. For example, the linear deflection parameter may be transformed into a non-linear exponential domain and then normalizes to a value between zero and one.

At 308, the ML model may determine a total amount of segment flow using the at least one non-linear deflection parameter applied to the traffic demand of the first traffic matrix, in accordance with some embodiments. Referring again to FIG. 2, the ML model 200 may determine a total amount of segment flow (e.g., traffic flow in a given segment).

At 310, the ML model may determine a link flow for each of the links using the total amount of segment flow and the second input to the machine learning model, in accordance with some embodiments. Referring again to FIG. 2, the ML model 200 may determine a link flow for each of the links using the total amount of segment flow and the link information. This link flow indicates an amount of traffic carried by a link.

At 312, the ML model may determine link utilization for each of the links using the link flows and a capacity for each of the links, in accordance with some embodiments. Referring again to FIG. 2, the ML model 200 may determine at 216 link utilization L for each of the links ($\ell$), wherein the link utilization for a link ($\ell$) is the amount of traffic flow of the link ($\ell$) divided by the capacity c($\ell$) for that link.

At 314, the ML model may learn using a gradient descent a minimum of a maximum amount of the link utilization over the links by at least adjusting a value of the at least one non-linear deflection parameter in accordance with some embodiments. As noted at FIG. 2, the ML model may learn at 218 a minimum of a maximum amount of the link utilization over the links by at least adjusting a value of the non-linear deflection parameter(s). The non-linear deflection parameter are adjusted until a minimum is found of a maximum utilization of the links given the input traffic matrix or matrices. The learning may be performed by a neural network (e.g., backpropagation and gradient descent).

At 316, the ML model may provide an output comprising the at least one non-linear deflection parameter and/or the at least one non-linear deflection parameter transformed back into a linear domain, in accordance with some embodiments. The ML model may output one or more deflection parameters (e.g., the non-linear deflection parameters or linear deflection parameters). These deflection parameters provide a routing scheme which may be considered optimize for the different traffic matrices 202A-C. And, the deflection parameters (which provides a fractional amount of traffic that is deflected to the intermediary node) may be deployed to corresponding nodes to define the routing scheme. For example, the output may be provided to one or more routing tables of the network.

As noted, the ML model may receive a plurality of traffic matrices indicative of traffic demands between at least the source node and the destination node of the network, wherein the total amount of segment flow is determined using the at least one non-linear deflection parameter applied to the traffic demands obtained from the plurality of traffic matrices. When this is the case, the output (which comprises the at least one non-linear deflection parameter and/or the at least one non-linear deflection parameter transformed back into the linear domain) takes into account the learning using a plurality of traffic matrices indicative of traffic demands between at least the source node and the destination node of the network.

Figure 4:
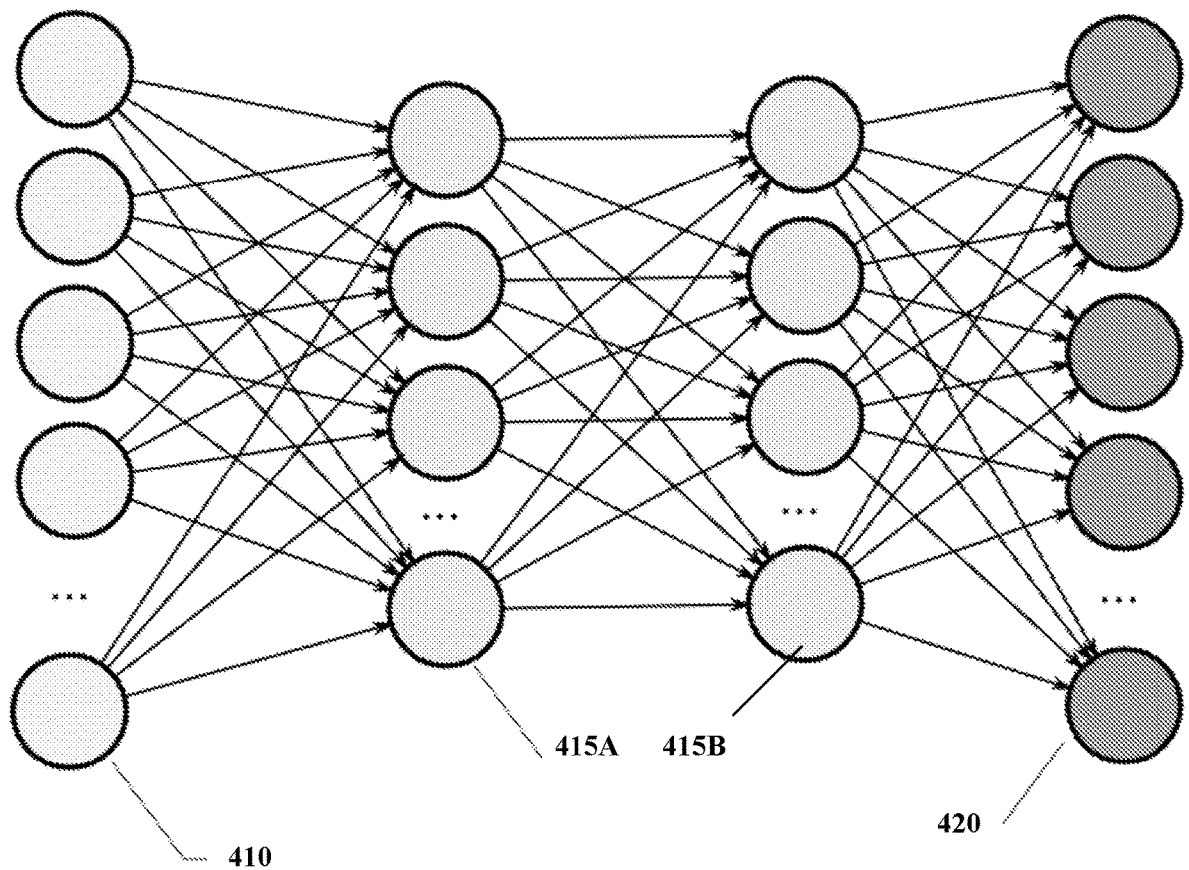
FIG. 4 depicts an example of a ML model, in accordance with some embodiments.

FIG. 4 depicts an example of a ML model 200, in accordance with some embodiments. The input layer 410 may include a node for each node in the network. The ML model may include one or more hidden layers 415A-B and an output layer 420.

The machine learning model 200 may be comprised in a network node, a user equipment, and/or other computer-based system. Alternatively, or additionally, the ML model may be provided as a service, such as a cloud service (accessible at a computing system such as a server via a network such as the Internet or other type of network).

Figure 5:
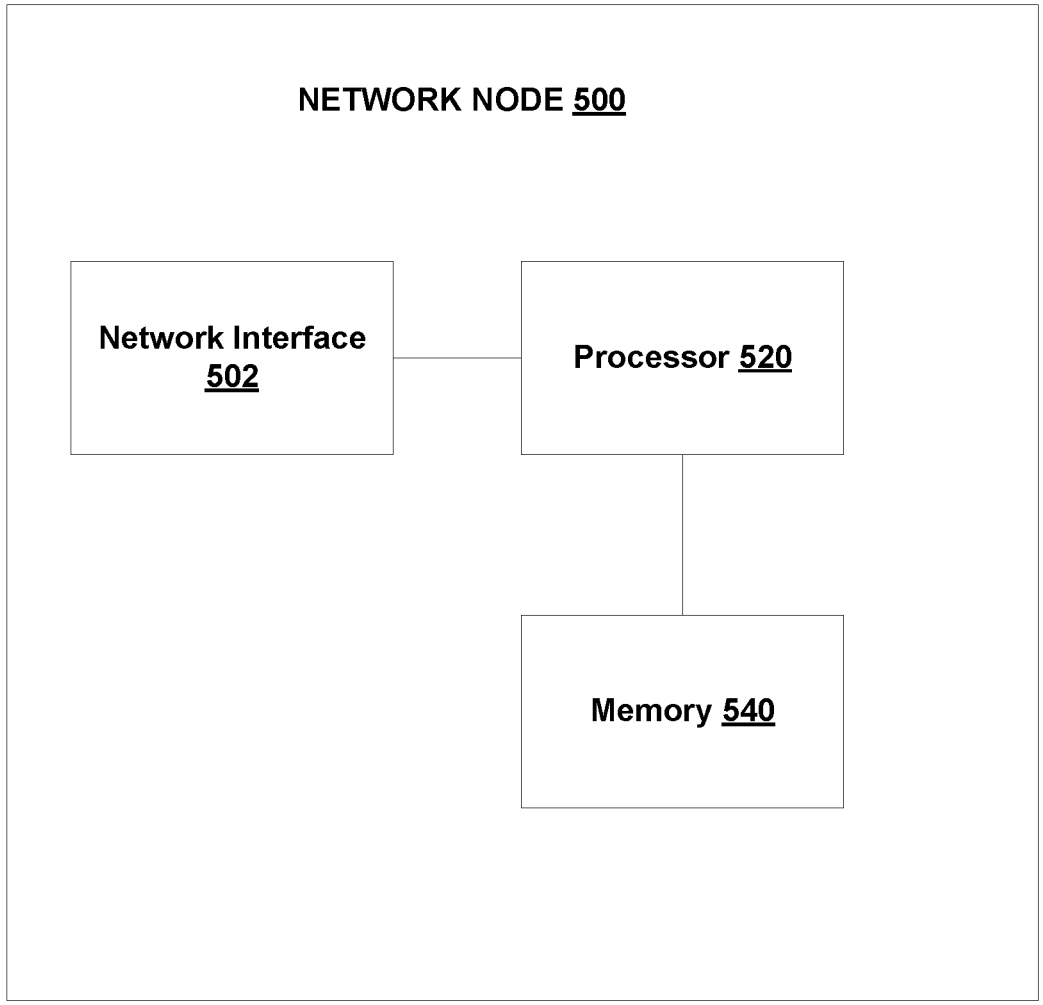
FIG. 5 depicts an example of a network node, in accordance with some embodiments.

FIG. 5 depicts a block diagram of a network node 500, in accordance with some embodiments. The network node 500 may comprise or be comprised in one or more network side nodes or functions.

The network node 500 may include a network interface 502, a processor 520, and a memory 504, in accordance with some embodiments. The network interface 502 may include wired and/or wireless transceivers to enable access other nodes including base stations, other network nodes, the Internet, other networks, and/or other nodes. The memory 504 may comprise volatile and/or non-volatile memory including program code, which when executed by at least one processor 520 provides, among other things, the processes disclosed herein with respect to the trainer entity, verifier, and/or the like.

Figure 6:
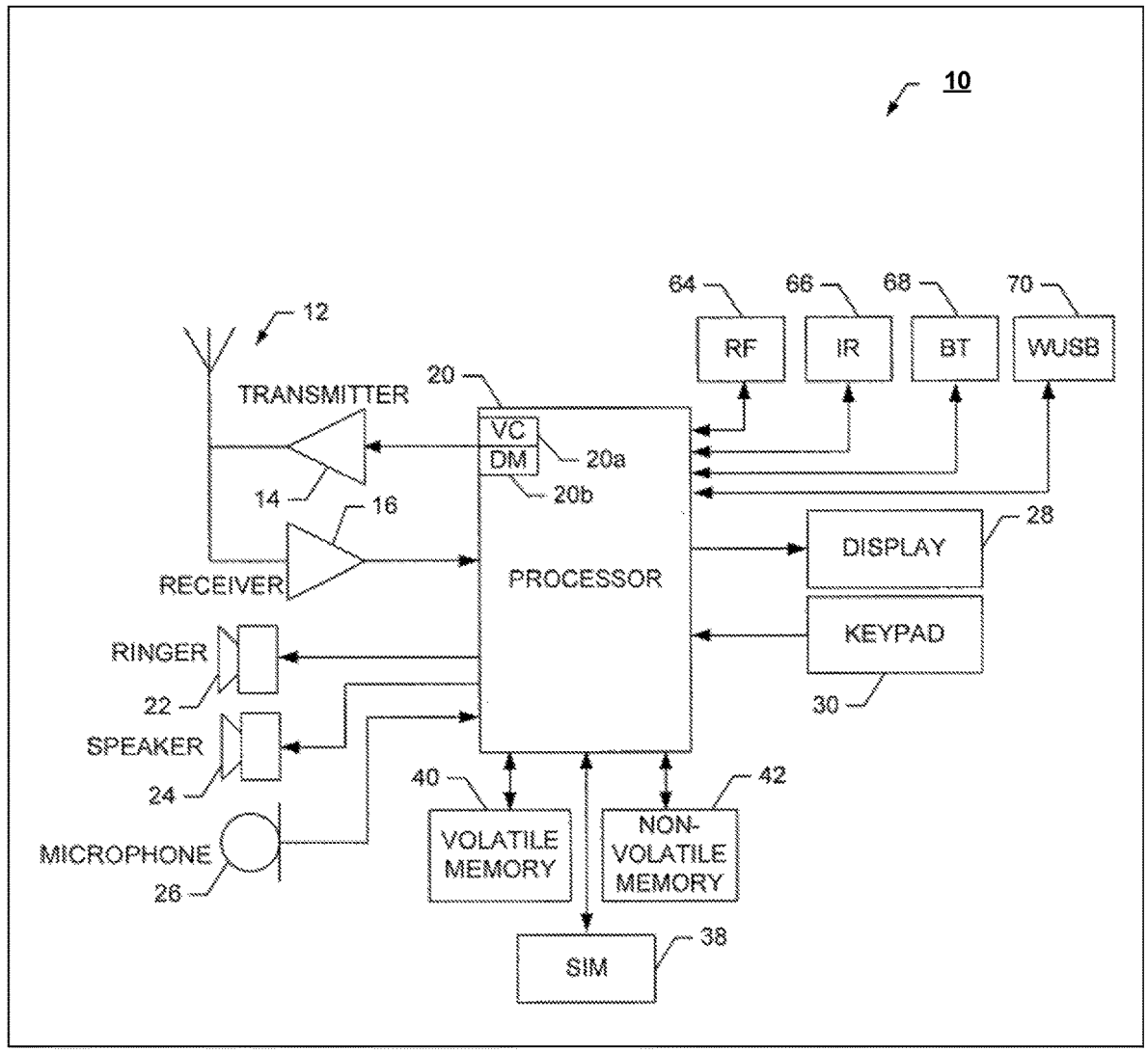
FIG. 6 depicts an example of an apparatus, in accordance with some embodiments.

FIG. 6 illustrates a block diagram of an apparatus 10, in accordance with some embodiments. The apparatus 10 may comprise or be comprised in a user equipment, such as user equipment (e.g., user entity, PRUs, etc.). In general, the various embodiments of the user equipment 204 can include cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions, in addition for vehicles such as autos and/or truck and aerial vehicles such as manned or unmanned aerial vehicle and as well as portable units or terminals that incorporate combinations of such functions. The user equipment may comprise or be comprised in an IoT device, an Industrial IoT (IIoT) device, and/or the like. In the case of an IoT device or IToT device, the UE may be configured to operate with less resources (in terms of for example power, processing speed, memory, and the like) when compared to a smartphone, for example.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signalling via electrical leads to the transmitter and receiver. Likewise, processor 20 may be configured to control other elements of apparatus 10 by effecting control signalling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signalling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, sixth-generation (6G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, U-SIM, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE, such as the user entity.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Figure 7:
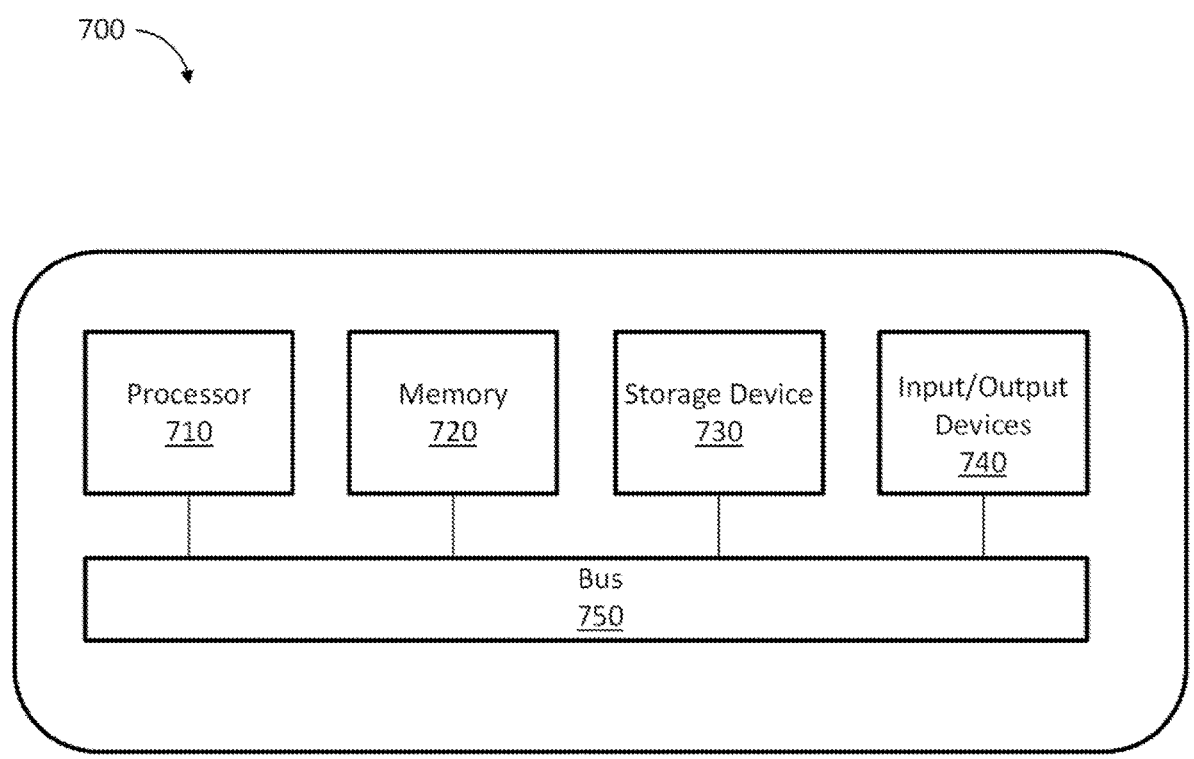
FIG. 7 depicts an example of a computing system, in accordance with some embodiments.

FIG. 7 depicts a block diagram illustrating a computing system 700, in accordance with some embodiments. For example, the system 700 can be used to implement the ML model 200. As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. In some implementations of the current subject matter, the processor 710 can be a single-threaded processor. Alternately, the processor 710 can be a multi-threaded processor. The process may be a multi-core processor have a plurality or processors or a single core processor. Alternatively, or additionally, the processor 710 can be a graphics processor unit (GPU), an AI chip, an/or the like. The processor 710 is capable of processing instructions stored in the memory 720 and/or on the storage device 730 to display graphical information for a user interface provided via the input/output device 740. The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces. According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

Without in any way limiting the scope, interpretation, or application of the claims appearing below, a technical effect of one or more of the example embodiments disclosed herein may include determining a routing scheme that is optimized across a wide array of traffic patterns.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1: A method comprising: receiving, as a first input to a machine learning model, a first traffic matrix, wherein the first traffic matrix indicates traffic demand between at least a source node and a destination node of a network; receiving, as a second input to the machine learning model, information regarding links associated with each segment of the network, wherein each segment corresponds to a pair of nodes of the network; transforming, by the machine learning model, at least one deflection parameter into at least one non-linear deflection parameter, wherein the at least one deflection parameter indicates a fractional amount of traffic that is carried between the source node and the destination node and deflected to an intermediary node; determining, by the machine learning model, a total amount of segment flow using the at least one non-linear deflection parameter applied to the traffic demand of the first traffic matrix; determining, by the machine learning model, a link flow for each of the links using the total amount of segment flow and the second input to the machine learning model; determining, by the machine learning model, link utilization for each of the links using the link flows and a capacity for each of the links; learning, by the machine learning model using a gradient descent, a minimum of a maximum amount of the link utilization over the links by at least adjusting a value of the at least one non-linear deflection parameter; and providing, by the machine learning model, an output comprising the at least one non-linear deflection parameter and/or the at least one non-linear deflection parameter transformed back into a linear domain.

Example 2: The method of Example 1, further comprising: receiving a plurality of traffic matrices indicative of traffic demands between at least the source node and the destination node of the network.

Example 3: The method of any of Examples 1-2, wherein the total amount of segment flow is determined using the at least one non-linear deflection parameter applied to the traffic demands obtained from the plurality of traffic matrices.

Example 4: The method of any of Examples 1-3, wherein the output comprising the at least one non-linear deflection parameter and/or the at least one non-linear deflection parameter transformed back into the linear domain takes into account the learning using a plurality of traffic matrices indicative of traffic demands between at least the source node and the destination node of the network.

Example 5: The method of any of Examples 1-4, wherein the output is provided to one or more routing tables of the network.

Example 6: The method of any of Examples 1-5, wherein the output provides the fractional amount of traffic that is deflected to the intermediary node.

Example 7: The method of any of Examples 1-6, wherein the at least one non-linear deflection parameter is generated by at least transforming the at least one deflection parameter into an exponential domain and then normalizing the at least one non-linear deflection parameter to a value between zero and one.

Example 8: The method of any of Examples 1-7, wherein the machine learning model comprises a loss function including the at least one non-linear deflection parameter.

Example 9: The method of any of Examples 1-9, wherein the machine learning model performs the learning as an unconstrained optimization of the minimum of the maximum amount of the link utilization.

Example 10: An apparatus comprising: at least one processor; at least one memory including instructions, which when executed by the at least one processor causes the apparatus to cause operations comprising: receiving, as a first input to a machine learning model, a first traffic matrix, wherein the first traffic matrix indicates traffic demand between at least a source node and a destination node of a network; receiving, as a second input to the machine learning model, information regarding links associated with each segment of the network, wherein each segment corresponds to a pair of nodes of the network; transforming, by the machine learning model, at least one deflection parameter into at least one non-linear deflection parameter, wherein the at least one deflection parameter indicates a fractional amount of traffic that is carried between the source node and the destination node and deflected to an intermediary node; determining, by the machine learning model, a total amount of segment flow using the at least one non-linear deflection parameter applied to the traffic demand of the first traffic matrix; determining, by the machine learning model, a link flow for each of the links using the total amount of segment flow and the second input to the machine learning model; determining, by the machine learning model, link utilization for each of the links using the link flows and a capacity for each of the links; learning, by the machine learning model using a gradient descent, a minimum of a maximum amount of the link utilization over the links by at least adjusting a value of the at least one non-linear deflection parameter; and providing, by the machine learning model, an output comprising the at least one non-linear deflection parameter and/or the at least one non-linear deflection parameter transformed back into a linear domain.

Example 11: The apparatus of Example 10, further comprising: receiving a plurality of traffic matrices indicative of traffic demands between at least the source node and the destination node of the network.

Example 12: The apparatus of any of Examples 10-11, wherein the total amount of segment flow is determined using the at least one non-linear deflection parameter applied to the traffic demands obtained from the plurality of traffic matrices.

Example 13: The apparatus of any of Examples 10-12, wherein the output comprising the at least one non-linear deflection parameter and/or the at least one non-linear deflection parameter transformed back into the linear domain takes into account the learning using a plurality of traffic matrices indicative of traffic demands between at least the source node and the destination node of the network.

Example 14: The apparatus of any of Examples 10-13, wherein the output is provided to one or more routing tables of the network.

Example 15: The apparatus of any of Examples 10-14, wherein the output provides the fractional amount of traffic that is deflected to the intermediary node.

Example 16: The apparatus of any of Examples 10-15, wherein the at least one non-linear deflection parameter is generated by at least transforming the at least one deflection parameter into an exponential domain and then normalizing the at least one non-linear deflection parameter to a value between zero and one.

Example 17: The apparatus of any of Examples 10-16, wherein the machine learning model comprises a loss function including the at least one non-linear deflection parameter.

Example 18: The apparatus of any of Examples 10-17, wherein the machine learning model performs the learning as an unconstrained optimization of the minimum of the maximum amount of the link utilization.

Example 19: A non-transitory computer-readable storage medium including instructions, which when executed by at least one processor causes operations comprising: receiving, as a first input to a machine learning model, a first traffic matrix, wherein the first traffic matrix indicates traffic demand between at least a source node and a destination node of a network; receiving, as a second input to the machine learning model, information regarding links associated with each segment of the network, wherein each segment corresponds to a pair of nodes of the network; transforming, by the machine learning model, at least one deflection parameter into at least one non-linear deflection parameter, wherein the at least one deflection parameter indicates a fractional amount of traffic that is carried between the source node and the destination node and deflected to an intermediary node; determining, by the machine learning model, a total amount of segment flow using the at least one non-linear deflection parameter applied to the traffic demand of the first traffic matrix; determining, by the machine learning model, a link flow for each of the links using the total amount of segment flow and the second input to the machine learning model; determining, by the machine learning model, link utilization for each of the links using the link flows and a capacity for each of the links; learning, by the machine learning model using a gradient descent, a minimum of a maximum amount of the link utilization over the links by at least adjusting a value of the at least one non-linear deflection parameter; and providing, by the machine learning model, an output comprising the at least one non-linear deflection parameter and/or the at least one non-linear deflection parameter transformed back into a linear domain.

Example 20: An apparatus comprising: means for receiving, as a first input to a machine learning model, a first traffic matrix, wherein the first traffic matrix indicates traffic demand between at least a source node and a destination node of a network; means for receiving, as a second input to the machine learning model, information regarding links associated with each segment of the network, wherein each segment corresponds to a pair of nodes of the network; means for transforming, by the machine learning model, at least one deflection parameter into at least one non-linear deflection parameter, wherein the at least one deflection parameter indicates a fractional amount of traffic that is carried between the source node and the destination node and deflected to an intermediary node; means for determining, by the machine learning model, a total amount of segment flow using the at least one non-linear deflection parameter applied to the traffic demand of the first traffic matrix; means for determining, by the machine learning model, a link flow for each of the links using the total amount of segment flow and the second input to the machine learning model; means for determining, by the machine learning model, link utilization for each of the links using the link flows and a capacity for each of the links; means for learning, by the machine learning model using a gradient descent, a minimum of a maximum amount of the link utilization over the links by at least adjusting a value of the at least one non-linear deflection parameter; and means for providing, by the machine learning model, an output comprising the at least one non-linear deflection parameter and/or the at least one non-linear deflection parameter transformed back into a linear domain.

Example 21: The apparatus of Example 20, further comprising means for performing any of the functions recited in any of claims 2-9.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, as a first input to a machine learning model, a first traffic matrix, wherein the first traffic matrix indicates traffic demand between at least a source node and a destination node of a network;
   receiving, as a second input to the machine learning model, information regarding links associated with each segment of the network, wherein each segment corresponds to a pair of nodes of the network;
   transforming, by the machine learning model, at least one deflection parameter into at least one non-linear deflection parameter, wherein the at least one deflection parameter indicates a fractional amount of traffic that is carried between the source node and the destination node and deflected to an intermediary node;
   determining, by the machine learning model, a total amount of segment flow using the at least one non-linear deflection parameter applied to the traffic demand of the first traffic matrix;
   determining, by the machine learning model, a link flow for each of the links using the total amount of segment flow and the second input to the machine learning model;
   determining, by the machine learning model, link utilization for each of the links using the link flows and a capacity for each of the links;
   learning, by the machine learning model using a gradient descent, a minimum of a maximum amount of the link utilization over the links by at least adjusting a value of the at least one non-linear deflection parameter; and
   providing, by the machine learning model, an output comprising the at least one non-linear deflection parameter and/or the at least one non-linear deflection parameter transformed back into a linear domain.

2. The method of claim 1, further comprising:
   receiving a plurality of traffic matrices indicative of traffic demands between at least the source node and the destination node of the network.

3. The method of claim 2, wherein the total amount of segment flow is determined using the at least one non-linear deflection parameter applied to the traffic demands obtained from the plurality of traffic matrices.

4. The method of claim 1, wherein the output comprising the at least one non-linear deflection parameter and/or the at least one non-linear deflection parameter transformed back into the linear domain takes into account the learning using a plurality of traffic matrices indicative of traffic demands between at least the source node and the destination node of the network.

5. The method of claim 1, wherein the output is provided to one or more routing tables of the network.

6. The method of claim 1, wherein the output provides the fractional amount of traffic that is deflected to the intermediary node.

7. The method of claim 1, wherein the at least one non-linear deflection parameter is generated by at least transforming the at least one deflection parameter into an exponential domain and then normalizing the at least one non-linear deflection parameter to a value between zero and one.

8. The method of claim 1, wherein the machine learning model comprises a loss function including the at least one non-linear deflection parameter.

9. The method of claim 1, wherein the machine learning model performs the learning as an unconstrained optimization of the minimum of the maximum amount of the link utilization.

10. An apparatus comprising:
    at least one processor;
    at least one memory including instructions, which when executed by the at least one processor causes the apparatus to cause operations comprising:
    receiving, as a first input to a machine learning model, a first traffic matrix, wherein the first traffic matrix indicates traffic demand between at least a source node and a destination node of a network;
    receiving, as a second input to the machine learning model, information regarding links associated with each segment of the network, wherein each segment corresponds to a pair of nodes of the network;
    transforming, by the machine learning model, at least one deflection parameter into at least one non-linear deflection parameter, wherein the at least one deflection parameter indicates a fractional amount of traffic that is carried between the source node and the destination node and deflected to an intermediary node;
    determining, by the machine learning model, a total amount of segment flow using the at least one non-linear deflection parameter applied to the traffic demand of the first traffic matrix;
    determining, by the machine learning model, a link flow for each of the links using the total amount of segment flow and the second input to the machine learning model;
    determining, by the machine learning model, link utilization for each of the links using the link flows and a capacity for each of the links;
    learning, by the machine learning model using a gradient descent, a minimum of a maximum amount of the link utilization over the links by at least adjusting a value of the at least one non-linear deflection parameter; and
    providing, by the machine learning model, an output comprising the at least one non-linear deflection parameter and/or the at least one non-linear deflection parameter transformed back into a linear domain.

11. The apparatus of claim 10, further comprising: receiving a plurality of traffic matrices indicative of traffic demands between at least the source node and the destination node of the network.

12. The apparatus of claim 11, wherein the total amount of segment flow is determined using the at least one non-linear deflection parameter applied to the traffic demands obtained from the plurality of traffic matrices.

13. The apparatus of claim 10, wherein the output comprising the at least one non-linear deflection parameter and/or the at least one non-linear deflection parameter transformed back into the linear domain takes into account the learning using a plurality of traffic matrices indicative of traffic demands between at least the source node and the destination node of the network.

14. The apparatus of claim 10, wherein the output is provided to one or more routing tables of the network.

15. The apparatus of claim 10, wherein the output provides the fractional amount of traffic that is deflected to the intermediary node.

16. The apparatus of claim 10, wherein the at least one non-linear deflection parameter is generated by at least transforming the at least one deflection parameter into an exponential domain and then normalizing the at least one non-linear deflection parameter to a value between zero and one.

17. The apparatus of claim 10, wherein the machine learning model comprises a loss function including the at least one non-linear deflection parameter.

18. The apparatus of claim 10, wherein the machine learning model performs the learning as an unconstrained optimization of the minimum of the maximum amount of the link utilization.

19. A non-transitory computer-readable storage medium including instructions, which when executed by at least one processor causes operations comprising:
receiving, as a first input to a machine learning model, a first traffic matrix, wherein the first traffic matrix indicates traffic demand between at least a source node and a destination node of a network;
receiving, as a second input to the machine learning model, information regarding links associated with each segment of the network, wherein each segment corresponds to a pair of nodes of the network;
transforming, by the machine learning model, at least one deflection parameter into at least one non-linear deflection parameter, wherein the at least one deflection parameter indicates a fractional amount of traffic that is carried between the source node and the destination node and deflected to an intermediary node;
determining, by the machine learning model, a total amount of segment flow using the at least one non-linear deflection parameter applied to the traffic demand of the first traffic matrix;
determining, by the machine learning model, a link flow for each of the links using the total amount of segment flow and the second input to the machine learning model;
determining, by the machine learning model, link utilization for each of the links using the link flows and a capacity for each of the links;
learning, by the machine learning model using a gradient descent, a minimum of a maximum amount of the link utilization over the links by at least adjusting a value of the at least one non-linear deflection parameter; and
providing, by the machine learning model, an output comprising the at least one non-linear deflection parameter and/or the at least one non-linear deflection parameter transformed back into a linear domain.

* * * * *